United States Patent
Cooke et al.

(10) Patent No.: US 10,995,203 B2
(45) Date of Patent: May 4, 2021

(54) ROTOMOLDED COMPOSITIONS, ARTICLES, AND PROCESSES FOR MAKING THE SAME

(71) Applicant: ExxonMobil Chemical Patents Inc., Baytown, TX (US)

(72) Inventors: Ronald N. Cooke, Ontario (CA); Timothy K. Bean, Ontario (CA)

(73) Assignee: ExxonMobil Chemical Patents Inc., Baytown, TX (US)

( * ) Notice: Subject to any disclaimer, the term of this patent is extended or adjusted under 35 U.S.C. 154(b) by 107 days.

(21) Appl. No.: 16/319,409

(22) PCT Filed: May 15, 2017

(86) PCT No.: PCT/US2017/032627
§ 371 (c)(1),
(2) Date: Jan. 21, 2019

(87) PCT Pub. No.: WO2018/017180
PCT Pub. Date: Jan. 25, 2018

(65) Prior Publication Data
US 2019/0284376 A1 Sep. 19, 2019

Related U.S. Application Data

(60) Provisional application No. 62/364,988, filed on Jul. 21, 2016.

(30) Foreign Application Priority Data

Sep. 13, 2016 (EP) .................................... 16188647

(51) Int. Cl.
| | | |
|---|---|---|
| *C08L 23/06* | (2006.01) | |
| *B29C 41/00* | (2006.01) | |
| *B29C 41/04* | (2006.01) | |
| *B29C 41/46* | (2006.01) | |
| *C08F 10/02* | (2006.01) | |
| *C08K 5/053* | (2006.01) | |
| *C08L 23/08* | (2006.01) | |
| *C08L 23/04* | (2006.01) | |
| *B29K 23/00* | (2006.01) | |

(52) U.S. Cl.
CPC ............ *C08L 23/06* (2013.01); *B29C 41/003* (2013.01); *B29C 41/04* (2013.01); *B29C 41/46* (2013.01); *C08F 10/02* (2013.01); *C08K 5/053* (2013.01); *C08L 23/04* (2013.01); *C08L 23/08* (2013.01); *B29K 2023/12* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,342,716 A | 8/1982 | Fishbauch et al. | |
| 5,530,055 A | 6/1996 | Needham | |
| 6,338,623 B1 | 1/2002 | Durrant | |
| 6,533,988 B2 | 3/2003 | Kallio et al. | |
| 6,894,109 B1 * | 5/2005 | Knudsen | B29B 9/12 524/570 |
| 2003/0078340 A1 * | 4/2003 | Fatnes | C08F 10/00 525/55 |
| 2005/0017409 A1 | 1/2005 | Weber et al. | |
| 2007/0082159 A1 * | 4/2007 | Mathieu | C08K 3/32 428/36.9 |
| 2009/0223955 A1 | 9/2009 | Maziers | |
| 2013/0281596 A1 * | 10/2013 | Mohan | C08L 23/02 524/427 |
| 2014/0088221 A1 | 3/2014 | Meyer et al. | |

FOREIGN PATENT DOCUMENTS

| | | |
|---|---|---|
| EP | 1600475 A | 11/2005 |
| WO | 2016/075163 A | 5/2016 |

\* cited by examiner

*Primary Examiner* — Robert T Butcher
(74) *Attorney, Agent, or Firm* — ExxonMobil Chemical Patents Inc.—Law Department

(57) ABSTRACT

Rotomolded compositions and articles made therefrom using metallocene-catalyzed polyolefin polymers and at least one adhesion promoter are provided.

19 Claims, No Drawings

ROTOMOLDED COMPOSITIONS, ARTICLES, AND PROCESSES FOR MAKING THE SAME

CROSS REFERENCE TO RELATED APPLICATIONS

This application is a National Phase Application claiming priority to PCT Application Serial No. PCT/US2017/032627 filed May 15, 2017, which claims priority to U.S. Provisional Application No. 62/364,988 filed Jul. 21, 2016 and EP 16188647.8, filed Sep. 13, 2016 which are incorporated by reference in their entireties.

FIELD OF THE INVENTION

The present invention generally relates to rotomolded compositions, rotomolded articles, and processes for make the same. In particular, the invention relates to rotomolded compositions and rotomolded articles made from metallocene-catalyzed polyethylene polymers and adhesion promoters.

BACKGROUND OF THE INVENTION

Rotational molding, more commonly known as rotomolding, is widely used for molding hollow articles, and can be used to mold very large articles, such as containers and tanks. To rotomold an article, typically, a powdered resin is charged inside a mold shell, which is then rotated on two axes and heated inside an oven to cause the resin to adhere to the inside of the mold. After sufficient heating time, the mold is moved to a cooling chamber, and after cooling, the molded part is removed to begin another molding cycle. See, for example, U.S. Pat. Nos. 4,342,716; 5,530,055; 6,338,623; and U.S. Patent Application No. 2014/0088221.

Rotational molding primarily uses polyolefin resins, with thermoplastic polymers of ethylene being principally used. Key properties for rotationally molded parts include appearance, shrinkage, warp resistance, and dimensional control. Typically, polyethylene resins catalyzed with Ziegler-Natta catalyst systems have been used. See, for example, U.S. Patent Application Publication No. 2005/0017409. Zeigler-Natta catalyzed resins contain a broad distribution of molecular weight species some of which are lower molecular weight and high in comonomer content. These species aid in the adhesion of the polymer to the mold surface during the rotational molding cooling cycle, thus, resulting in more uniform part cooling and acceptable finished part shrinkage, warpage, and dimension control.

Additionally, metallocene-catalyzed resins have been applied in rotomolding applications because they offer a good balance of operational stability, extended output, versatility with higher alpha olefin (HAO) performance, toughness and strength, good optical properties, down gauging opportunities, and resin sourcing simplicity. See, for example, U.S. Pat. No. 6,533,988. However, metallocene-catalyzed resins have narrower molecular weight distribution and generally lack the species which aid in adhesion of the polymer to the mold surface during the cooling cycle, resulting in inconsistent and undesirable finished part shrinkage and dimensional control. Thus, these deficiencies restrict broader deployment of metallocene catalyzed resins in rotational molding.

Thus, there remains a need for improvements in rotomolding compositions and articles that offer a good balance in appearance, shrinkage, resistance to warpage, and dimensional control.

SUMMARY OF THE INVENTION

In a class of embodiments, the invention provides for a process for improving the shrinkage of a rotomolding composition, the process comprising contacting at least one metallocene-catalyzed polyolefin polymer and from 1 to 7,500 ppm by weight of at least one adhesion promoter to produce the rotomolding composition, and rotomolding an article from the rotomolding composition.

In another class of embodiments, the invention provides for a process for improving the shrinkage of a rotomolding composition, the process comprising contacting at least one metallocene-catalyzed polyolefin polymer and from 1 to 7,500 ppm by weight of at least one adhesion promoter to produce the rotomolding composition, recovering the rotomolding composition, transferring the rotomolding composition to a mold, and rotomolding an article from the rotomolding composition.

In yet another class of embodiments, the invention provides for a rotomolded article made from the contact product of at least one metallocene-catalyzed ethylene-based polymer and from 1 to 7,500 ppm by weight of at least one adhesion promoter. As used herein, ethylene-based polymer refers to any polymer having a majority of units derived from ethylene.

Other embodiments of the invention are described, claimed herein, and are apparent by the following disclosure.

DETAILED DESCRIPTION OF ILLUSTRATIVE EMBODIMENTS

Before the present polymers, compounds, components, compositions, and/or methods are disclosed and described, it is to be understood that unless otherwise indicated this invention is not limited to specific polymers, compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an," and "the" include plural referents unless otherwise specified.

Definitions

For the purposes of this disclosure, the following definitions will apply, unless otherwise stated:

molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

the number average molecular weight is given by $$M_n = \frac{\sum_i n_i M_i}{\sum_i n_i}$$

the z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are determined by Gel Permeation Chromatography. The measurements proceed as follows. Gel Permeation Chromatography (Agilent PL-220), equipped with three in-line detectors, a differential refractive index detector (DRI), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$c = K_{DRI} I_{DRI}/(dn/dc)$ where $K_{DRI}$ is a constant determined by calibrating the DRI, and (dn/dc) is the refractive index increment for the system. The refractive index, n=1.500 for TCB at 145° C. and 2=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, is, for the solution flowing through the viscometer is calculated from their outputs. The intrinsic viscosity, [η], at each point in the chromatogram is calculated from the following equation:

$\eta_s = c[\eta] + 0.3(c[\eta])^2$ where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}.$$

$M_V$ is the viscosity-average molecular weight based on molecular weights determined by LS analysis. Z average branching index ($g'_{z_{ave}}$) is calculated using Ci=polymer concentration in the slice i in the polymer peak times the mass of the slice squared, Mi². All molecular weights are weight average unless otherwise noted. All molecular weights are reported in g/mol unless otherwise noted. This method is the preferred method of measurement and used in the examples and throughout the disclosures unless otherwise specified. See also, for background, Macromolecules, Vol. 34, No. 19, *Effect of Short Chain Branching on the Coil Dimensions of Polyolefins in Dilute Solution*, Sun et al., pg. 6812-6820 (2001).

The broadness of the composition distribution of the polymer may be characterized by $T_{75}$–$T_{25}$. TREF is measured using an analytical size TREF instrument (Polymerchar, Spain), with a column of the following dimensions: inner diameter (ID) 7.8 mm, outer diameter (OD) 9.53 mm, and column length of 150 mm. The column may be filled with steel beads. 0.5 mL of a 4 mg/ml polymer solution in orthodichlorobenzene (ODCB) containing 2 g BHT/4 L were charge onto the column and cooled from 140° C. to −15° C. at a constant cooling rate of 1.0° C./min. Subsequently, ODCB may be pumped through the column at a flow rate of 1.0 ml/min, and the column temperature may be increased at a constant heating rate of 2° C./min to elute the polymer. The polymer concentration in the eluted liquid may then be detected by means of measuring the absorption at a wavenumber of 2941 $cm^{-1}$ using an infrared detector. The concentration of the ethylene-α-olefin copolymer in the eluted liquid may be calculated from the absorption and plotted as a function of temperature. As used herein, $T_{75}$–$T_{25}$ values refer to where $T_{25}$ is the temperature in degrees Celsius at which 25% of the eluted polymer is obtained and $T_{75}$ is the temperature in degrees Celsius at which 75% of the eluted polymer is obtained via a TREF analysis. For example, in an embodiment, the polymer may have a $T_{75}$–$T_{25}$ value from 5 to 10, alternatively, a $T_{75}$–$T_{25}$ value from 5.5 to 10, and alternatively, a $T_{75}$–$T_{25}$ value from 5.5 to 8, alternatively, a $T_{75}$–$T_{25}$ value from 6 to 10, and alternatively, a $T_{75}$–$T_{25}$ value from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

In several classes of embodiments, the invention is directed to a process for improving the shrinkage of a rotomolding composition, the process comprising contacting at least one metallocene-catalyzed polyolefin polymer, for example, a metallocene-catalyzed polyethylene polymer, and from 1 to 7,500 ppm by weight of at least one adhesion promoter, alternatively, from 1 to 5,000 ppm by weight of the at least one adhesion promoter, alternatively, from 400 to 2,500 ppm by weight of the at least one adhesion promoter, or alternatively, from 500 to 2,000 ppm by weight of the at least one adhesion promoter, to produce the rotomolding composition.

The process may further comprise prior to the contacting, polymerizing ethylene, optionally, with one more olefins, with a metallocene catalyst system to produce the at least one metallocene-catalyzed polyolefin polymer. The catalyst system comprises the contact product of a metal complex, an activator, and optionally, a silica support. Examples of suitable metal complexes include but are not limited to (1,3-MeBuCp)$_2$ZrMe$_2$, bis(1-Me,3-nBuCp)ZrCl$_2$, Cp(Indenyl)ZrMe$_2$, (Me$_4$Cp)(nPrCp)ZrMe$_2$, Me$_2$-bis-(tetrahydroindenyl)ZrCl$_2$, rac-dimethylsilylbis[(2-methyl-4-phenyl)indenyl] zirconiumdimethyl, rac-dimethylsilylbis[(2-methyl) indenyl] zirconiumdimethyl, bis(n-PrCp)HfCl$_2$, rac-dimethylsilyl-bis(indenyl)hafniumdimethyl, rac-dimethylsilyl-bis(indenyl)hafniumdichloride, and mixtures thereof.

The polyolefin polymer, for example, polyethylene polymer, may include one or more of the following different types of polyethylene polymers as discussed further below and referred to as the first polyethylene polymer, second polyethylene polymer, third polyethylene polymer, etc.

Polyethylene Polymers
First Polyethylene Polymer

The first polyethylene polymer comprises from 70.0 mole % to 100.0 mole % of units derived from ethylene. The lower limit on the range of ethylene content may be from 70.0 mole %, 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, or 99.0 mole % based on the mole % of polymer units derived from ethylene. The first polyethylene polymer may have an upper ethylene limit of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene. For polyethylene copolymers, the first polyethylene polymer may have less than 50.0 mole % of polymer units derived from a $C_3$-$C_{20}$ olefin, preferably, e.g., hexene or octene. The lower limit on the range of $C_3$-$C_{20}$ olefin-content may be 25.0 mole %, 20.0 mole %, 15.0 mole %, 10.0 mole %, 8.0 mole %, 6.0 mole %, 5.0 mole %, 4.0 mole %, 3.0 mole %, 2.0 mole %, 1.0 mole %, or 0.5 mole %, based on polymer units derived from the $C_3$-$C_{20}$ olefin. The upper limit on the range of $C_3$-$C_{20}$ olefin-content may be 20.0 mole %, 15.0 mole %, 10.0 mole %, 8.0 mole %, 6.0 mole %, 5.0 mole %, 4.0 mole %, 3.0 mole %, 2.0 mole %, or 1.0 mole %, based on polymer units derived from the $C_3$ to $C_{20}$ olefin. Any of the lower limits may be combined with any of the upper limits to form a range. Comonomer content is based on the total content of all monomers in the polymer.

In a class of embodiments, the first polyethylene polymer may have minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis}$≥0.980, 0.985, ≥0.99, ≥0.995, or 1.0. While such values are indicative of little to no long chain branching, some long chain branches may be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

In some embodiments, the first polyethylene polymers may have a density in accordance with ASTM D-4703 and ASTM D-1505/ISO 1183 of from about 0.910 to about 0.925 g/cm$^3$, from about 0.910 to about 0.923 g/cm$^3$, from about 0.910 to about 0.920 g/cm$^3$, from about 0.915 to about 0.921 g/cm$^3$, from about 0.910 to about 0.918 g/cm$^3$, from about 0.912 to about 0.918 g/cm$^3$, or from about 0.912 to 0.917 g/cm$^3$.

The weight average molecular weight ($M_w$) of the first polyethylene polymers may be from about 15,000 to about 500,000 g/mol, from about 20,000 to about 250,000 g/mol, from about 25,000 to about 150,000 g/mol, from about 150,000 to about 400,000 g/mol, from about 200,000 to about 400,000 g/mol, or from about 250,000 to about 350,000 g/mol.

The first polyethylene polymers may have a molecular weight distribution (MWD) or ($M_w/M_n$) of from about 1.5 to about 5.0, from about 2.0 to about 4.0, from about 3.0 to about 4.0, or from about 2.5 to about 4.0.

The first polyethylene polymers may have a z-average molecular weight ($M_z$) to weight average molecular weight ($M_w$) greater than about 1.5, or greater than about 1.7, or greater than about 2.0. In some embodiments, this ratio is from about 1.7 to about 3.5, from about 2.0 to about 3.0, or from about 2.2 to about 3.0.

The first polyethylene polymers may have a melt index (MI) or ($I_{2.16}$) as measured by ASTM D-1238-E (190° C./2.16 kg) of about 0.1 to about 300 g/10 min, about 0.1 to about 100 g/10 min, about 0.1 to about 50 g/10 min, about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, about 0.5 g/10 min to about 1.0 g/10 min, about 0.6 g/10 min to about 1.0 g/10 min, about 0.7 g/10 min to about 1.0 g/10 min, or about 0.75 g/10 min to about 0.95 g/10 min.

The first polyethylene polymers may have a melt index ratio (MIR) ($I_{21.6}/I_{2.16}$) (as defined below) of from about 10.0 to about 50.0, from about 15.0 to about 45.0, from about 20.0 to about 40.0, from about 20.0 to about 35.0, from about 22 to about 38, from about 20 to about 32, from about 25 to about 31, or from about 28 to about 30.

In a class of embodiments, the first polyethylene polymers may contain less than 5.0 ppm hafnium, less than 2.0 ppm hafnium, less than 1.5 ppm hafnium, or less than 1.0 ppm hafnium. In other embodiments, the first polyethylene polymers may contain from about 0.01 ppm to about 2 ppm hafnium, from about 0.01 ppm to about 1.5 ppm hafnium, or from about 0.01 ppm to about 1.0 ppm hafnium.

Typically, the amount of hafnium is greater than the amount of zirconium in the first polyethylene polymer. In a particular class of embodiments, the ratio of hafnium to zirconium (ppm/ppm) is at least about 2.0, at least about 10.0, at least about 15, at least about 17.0, at least about 20.0, at least about 25.0, at least about 50.0, at least about 100.0, at least about 200.0, or at least about 500.0 or more. While zirconium generally is present as an impurity in hafnium, it will be realized in some embodiments where particularly pure hafnium-containing catalysts are used, the amount of zirconium may be extremely low, resulting in a virtually undetectable or undetectable amount of zirconium in the first polyethylene polymer. Thus, the upper limit on the ratio of hafnium to zirconium in the polymer may be quite large.

In several classes of embodiments, the first polyethylene polymers may have at least a first peak and a second peak in a comonomer distribution analysis, wherein the first peak has a maximum at a log($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log($M_w$) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In any of the embodiments described above, the first polyethylene polymer may have one or more of the following properties: a melt index (MI) (190° C./2.16 kg) of from about 0.1 g/10 min to about 5.0 g/10 min; a melt index ratio (MIR) of from about 15 to about 30; a $M_w$ of from about 20,000 to about 200,000 g/mol; a $M_w/M_n$ of from about 2.0 to about 4.5; and a density of from about 0.910 to about 0.925 g/cm$^3$. In any of these embodiments, the amount of hafnium is greater than the amount of zirconium and a ratio of hafnium to zirconium (ppm/ppm) may be at least about 2.0, at least about 10.0, at least about 15.0, at least about 17.0, at least about 20.0, or at least about 25.0.

In several of the classes of embodiments described above, the first polyethylene polymer may have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In some embodiments, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

Additionally, the melt strength of the first polyethylene polymer at a particular temperature may be determined with a Gottfert Rheotens Melt Strength Apparatus. To determine the melt strength, unless otherwise stated, a polymer melt strand extruded from the capillary die is gripped between two counter-rotating wheels on the apparatus. The take-up speed is increased at a constant acceleration of 2.4 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The melt strength of the first polyethylene polymer may be in the range from about 1 to about 100 cN, about 1 to about 50 cN, about 1 to about 25 cN, about 3 to about 15 cN, about 4 to about 12 cN, or about 5 to about 10 cN.

Materials and processes for making the first polyethylene polymer have been described in, for example, U.S. Pat. No. 6,956,088, particularly Example 1; U.S. Patent Application Publication No. 2009/0297810, particularly Example 1; U.S. Patent Application Publication No. 2015/0291748, particularly PE1-PE5 in the Examples; and WO 2014/099356, particularly PE3 referenced on page 12 and in the Examples, including the use of a silica supported hafnium transition metal metallocene/methylalumoxane catalyst system described in, for example, U.S. Pat. Nos. 6,242,545 and 6,248,845, particularly Example 1.

The first polyethylene polymer is commercially available from ExxonMobil Chemical Company, Houston, Tex., and sold under Exceed XP™ metallocene polyethylene (mPE). Exceed XP™ mPE offers step-out performance with respect to, for example, dart drop impact strength, flex-crack resistance, and machine direction (MD) tear, as well as maintaining stiffness at lower densities. Exceed XP™ mPE also offers optimized solutions for a good balance of melt strength, toughness, stiffness, and sealing capabilities which makes this family of polymers well-suited for blown film/sheet solutions.

Second Polyethylene Polymer

The second polyethylene polymers are ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

In an embodiment of the invention, the second polyethylene polymer comprises from about 8 wt % to about 15 wt %, of $C_3$-$C_{10}$ α-olefin derived units, and from about 92 wt % to about 85 wt % ethylene derived units, based upon the total weight of the polymer.

In another embodiment of the invention, the second polyethylene polymer comprises from about 9 wt % to about 12 wt %, of $C_3$-$C_{10}$ α-olefin derived units, and from about 91 wt % to about 88 wt % ethylene derived units, based upon the total weight of the polymer.

The second polyethylene polymers may have a melt index (MI), $I_{2.16}$ or simply $I_2$ for shorthand according to ASTM D1238, condition E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28, or ≥about 0.30 g/10 min. Additionally, the second polyethylene polymers may have a melt index ($I_{2.16}$)≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. Ranges expressly disclosed include, but are not limited to, ranges formed by combinations any of the above-enumerated values, e.g., from about 0.1 to about 3.0, about 0.2 to about 2.0, about 0.2 to about 0.5 g/10 min, etc.

The second polyethylene polymers may also have High Load Melt Index (HLMI), $I_{21.6}$ or $I_{21}$ for shorthand, measured in accordance with ASTM D-1238, condition F (190° C./21.6 kg). For a given polymer having an MI and MIR as defined herein, the HLMI is fixed and can be calculated in accordance with the following paragraph.

The second polyethylene polymers may have a Melt Index Ratio (MIR) which is a dimensionless number and is the ratio of the high load melt index to the melt index, or $I_{21.6}/I_{2.16}$ as described above. The MIR of the second polyethylene polymers may be from 25 to 80, alternatively, from 25 to 60, alternatively, from about 30 to about 55, and alternatively, from about 35 to about 50.

The second polyethylene polymers may have a density ≥about 0.905 g/cm³, ≥about 0.910 g/cm³, ≥about 0.912 g/cm³, ≥about 0.913 g/cm³, ≥about 0.915 g/cm³, ≥about 0.916 g/cm³, ≥about 0.917 g/cm³, ≥about 0.918 g/cm³. Additionally or alternatively, second polyethylene polymers may have a density ≤about 0.945 g/cm³, e.g., ≤about 0.940 g/cm³, ≤about 0.937 g/cm³, ≤about 0.935 g/cm³, ≤about 0.930 g/cm³, ≤about 0.925 g/cm³, ≤about 0.920 g/cm³, or ≤about 0.918 g/cm³. Ranges expressly disclosed include, but are not limited to, ranges formed by combinations any of the above-enumerated values, e.g., from about 0.905 to about 0.945 g/cm³, 0.910 to about 0.935 g/cm³, 0.912 to 0.930 g/cm³, 0.916 to 0.925 g/cm³, 0.918 to 0.920 g/cm³, etc. Density is determined using chips cut from plaques compression molded in accordance with ASTM D-1928 Procedure C, aged in accordance with ASTM D-618 Procedure A, and measured as specified by ASTM D-1505.

Typically, although not necessarily, the second polyethylene polymers may have a molecular weight distribution (MWD, defined as $M_w/M_n$) of about 2.5 to about 5.5, preferably 3.0 to 4.0.

The melt strength may be in the range from about 1 to about 100 cN, about 1 to about 50 cN, about 1 to about 25 cN, about 3 to about 15 cN, about 4 to about 12 cN, or about 5 to about 10 cN.

The second polyethylene polymers may also be characterized by an averaged 1% secant modulus (M) of from 10,000 to 60,000 psi (pounds per square inch), alternatively, from 20,000 to 40,000 psi, alternatively, from 20,000 to 35,000 psi, alternatively, from 25,000 to 35,000 psi, and alternatively, from 28,000 to 33,000 psi, and a relation between M and the dart drop impact strength in g/mil (DIS) complying with formula (A):

$$DIS \geq 0.8*[100+e^{(11.71-0.000268M+2.183\times10^{-9}M^2)}] \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The branching index, g' is inversely proportional to the amount of branching. Thus, lower values for g' indicate relatively higher amounts of branching. The amounts of short and long-chain branching each contribute to the branching index according to the formula:

$$g'=g'_{LCB} \times g'_{SCB}.$$

Typically, the second polyethylene polymers have a g'vis of 0.85 to 0.99, particularly, 0.87 to 0.97, 0.89 to 0.97, 0.91 to 0.97, 0.93 to 0.95, or 0.97 to 0.99.

The second polyethylene polymers may be made by any suitable polymerization method including solution polymerization, slurry polymerization, supercritical, and gas phase polymerization using supported or unsupported catalyst systems, such as a system incorporating a metallocene catalyst.

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in practicing the present invention include those described in, U.S. Pat. Nos. 5,466,649; 6,476,171; 6,225,426; and 7,951,873, and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.) To obtain the second polyethylene polymers, individual flow rates of ethylene, comonomer, and hydrogen should be controlled and adjusted to obtain the desired polymer properties.

Suitable commercial polymers for the second polyethylene polymer are available from ExxonMobil Chemical Company as Enable™ metallocene polyethylene (mPE) resins.

Third Polyethylene Polymer

The third polyethylene polymers are ethylene-based polymers comprising ≥50.0 wt % of polymer units derived from ethylene and ≤50.0 wt %, preferably 1.0 wt % to 35.0 wt %, even more preferably 1 to 6 wt % of polymer units derived from a $C_3$ to $C_{20}$ alpha-olefin comonomer (for example, butane, hexene or octene).

The third polyethylene polymer may have a density of ≥about 0.910 g/cm$^3$, ≥about 0.915 g/cm$^3$, ≥about 0.920 g/cm$^3$, ≥about 0.925 g/cm$^3$, ≥about 0.930 g/cm$^3$, or ≥about 0.940 g/cm$^3$. Alternatively, the third polyethylene polymer may have a density of ≤about 0.950 g/cm$^3$, e.g., ≤about 0.940 g/cm$^3$, ≤about 0.930 g/cm$^3$, ≤about 0.925 g/cm$^3$, ≤about 0.920 g/cm$^3$, or ≤about 0.915 g/cm$^3$. Ranges expressly disclosed include ranges formed by combinations any of the above-enumerated values, e.g., 0.910 to 0.950 g/cm$^3$, 0.910 to 0.930 g/cm$^3$, 0.910 to 0.925 g/cm$^3$, etc. Density is determined using chips cut from plaques compression molded in accordance with ASTM D-1928 Procedure C, aged in accordance with ASTM D-618 Procedure A, and measured as specified by ASTM D-1505.

The third polyethylene polymer may have a melt index ($I_{2.16}$) according to ASTM D1238 (190° C./2.16 kg) of ≥about 0.5 g/10 min, e.g., ≥about 0.5 g/10 min, ≥about 0.7 g/10 min, ≥about 0.9 g/10 min, ≥about 1.1 g/10 min, ≥about 1.3 g/10 min, ≥about 1.5 g/10 min, or ≥about 1.8 g/10 min. Alternatively, the melt index ($I_{2.16}$) may be ≤about 8.0 g/10 min, ≤about 7.5 g/10 min, ≤about 5.0 g/10 min, ≤about 4.5 g/10 min, ≤about 3.5 g/10 min, ≤about 3.0 g/10 min, ≤about 2.0 g/10 min, e.g., ≤about 1.8 g/10 min, ≤about 1.5 g/10 min, ≤about 1.3 g/10 min, ≤about 1.1 g/10 min, ≤about 0.9 g/10 min, or ≤about 0.7 g/10 min, 0.5 to 2.0 g/10 min, particularly 0.75 to 1.5 g/10 min. Ranges expressly disclosed include ranges formed by combinations any of the above-enumerated values, e.g., about 0.5 to about 8.0 g/10 min, about 0.7 to about 1.8 g/10 min, about 0.9 to about 1.5 g/10 min, about 0.9 to 1.3, about 0.9 to 1.1 g/10 min, about 1.0 g/10 min, etc.

In particular embodiments, the third polyethylene polymer may have a density of 0.910 to 0.920 g/cm$^3$, a melt index ($I_{2.16}$) of 0.5 to 8.0 g/10 min, and a CDBI of 60.0% to 80.0%, preferably between 65% and 80%.

The third polyethylene polymers are generally considered linear. Suitable third polyethylene polymers are available from ExxonMobil Chemical Company under the trade name Exceed™ metallocene (mPE) resins. The MIR for Exceed materials will typically be from about 15 to about 20.

Fourth Polyethylene Polymer

The fourth polyethylene polymers may be a copolymer of ethylene, and one or more polar comonomers or $C_3$ to $C_{10}$ α-olefins. Typically, the fourth polyethylene polymer includes 99.0 wt % to about 80.0 wt %, 99.0 wt % to 85.0 wt %, 99.0 wt % to 87.5 wt %, 95.0 wt % to 90.0 wt %, of polymer units derived from ethylene and about 1.0 to about 20.0 wt %, 1.0 wt % to 15.0 wt %, 1.0 wt % to 12.5 wt %, or 5.0 wt % to 10.0 wt % of polymer units derived from one or more polar comonomers, based upon the total weight of the polymer. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, trans-butene-2, isobutylene, 3,3,-dimethylbutene-1, 4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

In some embodiments, the fourth polyethylene polymer is an ethylene/vinyl acetate copolymer having about 2.0 wt % to about 15.0 wt %, typically about 5.0 wt % to about 10.0 wt %, polymer units derived from vinyl acetate, based on the amounts of polymer units derived from ethylene and vinyl acetate (EVA). In certain embodiments, the EVA resin can further include polymer units derived from one or more comonomer units selected from propylene, butene, 1-hexene, 1-octene, and/or one or more dienes.

Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

Suitable fourth polyethylene polymers include Escorene™ Ultra EVA resins, Escor™ EAA resins, ExxonMobil™ EnBA resins, and Optema™ EMA resins available from ExxonMobil Chemical Company, Houston, Tex.

Fifth Polyethylene Polymer

The fifth polyethylene polymers are generally heterogeneously branched ethylene polymers. The term "heterogeneously branched ethylene polymer" refers to a polymer having polymer units derived from ethylene and preferably at least one $C_3$-$C_{20}$ alpha-olefin and having a CDBI <50.0%. Typically, such polymers are the result of a Ziegler-Natta polymerization process. Such polymers are also referred to as Linear Low Density Polyethylene Polymers or LLDPEs, more particularly sometimes as ZN LLDPEs.

Heterogeneously branched ethylene polymers differ from the homogeneously branched ethylene polymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). The amount of each of these fractions varies depending upon the whole polymer properties desired. For example, a linear homopolymer polyethylene polymer has neither branched nor highly branched fractions, but is linear.

Heterogeneously branched ethylene polymer polymers typically have a CDBI <50.0%, preferably <45.0%, <40.0%, <35.0%, <30.0%, <25.0%, or <20.0%. In particular embodiments the CDBI of the heterogeneously branched ethylene polymer is 20.0 to <50.0%, 20.0 to 45.0%, 20.0 to 35.0%, 20.0 to 30.0%, 20.0 to 25.0%, 25.0 to 30.0%, 25.0 to 35.0%, 25.0 to 40.0%, 25.0 to 45.0%, 30.0 to 35.0%, 30.0 to 40.0%, 30.0 to 45.0%, 30.0 to <50.0%, 35.0 to 40.0%, 35.0 to <50.0%, 40.0 to 45.0%, or 40.0 to <50.0%.

The heterogeneously branched ethylene polymer typically comprises 80 to 100 mole % of polymer units derived from ethylene and 0 to 20.0 mole % of polymer units derived from at least one $C_3$ to $C_{20}$ alpha-olefin, preferably the alpha olefin has 4 to 8 carbon atoms. The content of comonomer is determined based on the mole fraction based on the content of all monomers in the polymer.

The content of polymer units derived from alpha-olefin in the heterogeneously branched ethylene polymer may be any amount consistent with the above ranges for ethylene. Some preferred amounts are 2.0 to 20.0 mole %, 2.0 to 15.0 mole %, or 5.0 to 10.0 mole %, particularly where the polymer units are derived from one or more $C_4$-$C_8$ alpha-olefins, more particularly butene-1, hexene-1, or octene-1.

Heterogeneously branched ethylene polymers may have a density ≤0.950 g/cm³, preferably ≤0.940 g/cm³, particularly from 0.915 to about 0.950 g/cm³, preferably 0.920 to 0.940 g/cm³.

The melt index, $I_{2.16}$, according to ASTM D-1238-E (190° C./2.16 kg) of the heterogeneously branched ethylene polymer is generally from about 0.1 g/10 min to about 100.0 g/10 min.

Suitable heterogeneously branched ethylene polymers and other polyethylene polymers include ExxonMobil™ Linear Low Density Polyethylene (LLDPE) and ExxonMobil™ NTX Super hexene copolymer available from ExxonMobil Chemical Company, Houston, Tex.

A sixth polyethylene polymer may also be employed and is a High Density Polyethylene (HDPE). The HDPE may be unimodal or bimodal/multimodal and have a narrow molecular weight distribution (MWD) or broad MWD.

A seventh polyethylene polymer may also be employed and is a Low Density Polyethylene made from a High Pressure Polymerization Process. Suitable resins include Nexxstar™ resins available from ExxonMobil and other LDPE's.

Adhesion Promoter

The adhesion promoter may include one or more of the following.

Propylene-Based Elastomer

The adhesion promoter may include a propylene-based polymer. A propylene-based polymer or elastomer ("PBE") may comprise propylene and from about 5 wt % to about 25 wt % of one or more comonomers selected from ethylene and/or $C_4$-$C_{12}$ α-olefins. In one or more embodiments, the α-olefin comonomer units may be derived from ethylene, butene, pentene, hexene, 4-methyl-1-pentene, octene, or decene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

In one or more embodiments, the PBE may include at least about 2 wt %, at least about 3 wt %, at least about 4 wt %, at least about 5 wt %, at least about 6 wt %, at least about 7 wt %, or at least about 8 wt %, or at least about 9 wt %, or at least about 10 wt %, at least about 12 wt % ethylene-derived units, 13 wt % ethylene-derived units, or 15 wt % ethylene-derived units. In those or other embodiments, the PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and α-olefin derived units. Stated another way, the PBE may include at least about 70 wt %, or at least about 75 wt %, or at least about 80 wt %, or at least about 81 wt % propylene-derived units, or at least about 82 wt % propylene-derived units, or at least about 83 wt % propylene-derived units; and in these or other embodiments, the PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units. In certain embodiments, the PBE may comprise from about 5 wt % to about 25 wt % ethylene-derived units, or from about 9 wt % to about 18 wt % ethylene-derived units.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In one or more embodiments, the Tm of the PBE (as determined by DSC) is less than about 115° C., or less than about 110° C., or less than about 100° C., or less than about 95° C., or less than about 90° C.

In one or more embodiments, the PBE may be characterized by its heat of fusion (Hf), as determined by DSC. In one or more embodiments, the PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. In these or other embodiments, the PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g.

As used within this specification, DSC procedures for determining Tm and Hf include the following. The polymer is pressed at a temperature of from about 200° C. to about 230° C. in a heated press, and the resulting polymer sheet is hung, at about 23° C., in the air to cool. About 6 to 10 mg of the polymer sheet is removed with a punch die. This 6 to 10 mg sample is annealed at about 23° C. for about 80 to 100 hours. At the end of this period, the sample is placed in a DSC (Perkin Elmer Pyris One Thermal Analysis System) and cooled at a rate of about 10° C./min to about −50° C. to about −70° C. The sample is heated at a rate of about 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units, as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50.

In one or more embodiments, the PBE may have a % crystallinity of from about 0.5% to about 40%, or from about 1% to about 30%, or from about 5% to about 25%, determined according to DSC procedures. Crystallinity may be determined by dividing the Hf of a sample by the Hf of a 100% crystalline polymer, which is assumed to be 189 joules/gram for isotactic polypropylene or 350 joules/gram for polyethylene.

In one or more embodiments, the PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792.

In one or more embodiments, the PBE may have a melt index (MI) (ASTM D-1238-E, 2.16 kg @ 190° C.), of less than or equal to about 100 g/10 min, or less than or equal to about 50 g/10 min, or less than or equal to about 25 g/10 min, or less than or equal to about 20 g/10 min, or less than or equal to about 10 g/10 min, or less than or equal to about 9.0 g/10 min, or less than or equal to about 8.0 g/10 min, or less than or equal to about 7.0 g/10 min. In alternative embodiments, the PBE may have a melt index (MI) (ASTM D-1238-E, 2.16 kg @ 190° C.), of from 0.5 g/10 min to 60 g/10 min, of from 1 g/10 min to 50 g/10 min, of from 1 g/10 min to 40 g/10 min, of from 3 g/10 min to 25 g/10 min, or of from 8 g/10 min to 25 g/10 min.

In one or more embodiments, the PBE may have a melt flow rate (MFR), as measured according to ASTM D-1238-E (2.16 kg weight @ 230° C.), greater than about 1 g/10 min, or greater than about 2 g/10 min, or greater than about 5 g/10 min, or greater than about 8 g/10 min, greater than about 10 g/10 min, greater than about 15 g/10 min, or greater than about 30 g/10 min. In the same or other embodiments, the PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In certain embodiments, the PBE may have an MFR from about 1 to about 100 g/10 min, or from about 2 to about 75 g/10 min, or from about 10 to about 50 g/10 min.

Suitable commercially available propylene-based polymers include Vistamaxx™ Performance Polymers from ExxonMobil Chemical Company, for example Vistamaxx™ Performance Polymers 6202, 6502, and 8880, and Versify™ Polymers from The Dow Chemical Company, Midland, Mich.

Hydrocarbon Resin/Modified Hydrocarbon Resin

The adhesion promoter may also include hydrocarbon resins and/or modified hydrocarbon resins. Such resins include aliphatic hydrocarbon resins, cyclic aliphatic hydrocarbon resins, modified aliphatic hydrocarbon resins, aromatic hydrocarbon resins, modified aromatic hydrocarbon resins, cyclopentadiene-based resins (including but not limited to polycyclopentadiene resins, hydrogenated polycyclopentadiene resins, etc.), gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes, modified terpenes, hydrogenated rosin acids, hydrogenated rosin acids, hydrogenated rosin esters, derivatives thereof and/or combinations thereof. Such resins and methods for making them have been described in, for example, U.S. Pat. Nos. 4,629,766; 5,874,512; 6,232,418; 6,455,652; and 6,992,131.

In a class of embodiments, the hydrocarbon resin and modified hydrocarbon resin may have softening points of greater than 80° C., greater than 85° C., greater than 90° C., greater than 92° C., greater than 95° C., greater than 100° C., greater than 110° C., greater than 120° C., greater than 135° C., greater than 140° C., greater than 145° C., greater than 150° C., or greater than 160° C., as measured by ASTM D 6090-97. Alternatively stated, the hydrocarbon resin and modified hydrocarbon resin may have softening points of from 80° C. to 160° C., 82° C. to 140° C., 85° C. to 130° C., 90° C. to 125° C., 95° C. to 120° C., or 95° C. to 140° C., as measured by ASTM D 6090-97.

The hydrocarbon resin and modified hydrocarbon resin may also have an aromaticity (% aromatic protons) of 15% or less, 12% or less, 8% or less, 6% or less, 4% or less, or 2% or less. Alternatively stated, the hydrocarbon resin and modified hydrocarbon resin may have an aromaticity (% aromatic protons) of from 1 to 15%, 1 to 12%, 1 to 10%, 1 to 8%, 2 to 6%, or 2 to 4%.

Suitable hydrocarbon resins are available as Escorez™ resins, for example, Escorez™ resins 1000, 2000, and 5000 series, from ExxonMobil Chemical Company, Houston, Tex.

Ethylene Glycol

In another class of embodiments, the adhesion promoter may include ethylene glycol. Ethylene glycol (ethane-1,2-diol) is typically produced by the reaction of ethylene oxide with water. Ethylene oxide may be produced by the catalytic gas phase oxidation of ethylene with a molecular oxygen-containing gas in the presence of a silver catalyst. See, for example, U.S. Pat. No. 5,763,691.

Waxes

In yet another class of embodiments, the adhesion promoter may include one or more waxes, such as polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, and combinations and/or derivatives thereof. Some of these waxes have been described in, for example, U.S. Patent Application Publication No. 2003/0154885.

Polymer Blends

One or more polymers as described above may combined with one or more adhesion promoters as described above in, for example, a blend or other composition, to be rotomolded into a finished article.

The blend or other composition may comprise from 1 wt % to 99.9 wt %, from 30 wt % to 99.9 wt %, from 40 wt % to 99.9 wt %, from 50 wt % to 99.9 wt %, from 60 wt % to 99.9 wt %, from 65 wt % to 99.9 wt %, from 70 wt % to 99.9 wt %, from 75 wt % to 99.9 wt %, from 85 wt % to 99.9 wt %, from 90 wt % to 99.9 wt %, from 95 wt % to 99.9 wt %, or from 98 wt % to 99.9 wt %, of the one or more polymers as described above, based upon the total weight of the blend or other composition.

The blend or other composition may include one or more additives and/or one or more processing aids.

Additives

First Antioxidant

The first antioxidant comprises one or more antioxidants. They include, but are not limited to, hindered phenols, for example, octadecyl-3-(3,5-di-tert.butyl-4-hydroxyphenyl)-propionate (CAS 002082-79-3) commercially available as IRGANOX™ 1076, pentaerythritol tetrakis (3-(3,5-di-tert-butyl-4-hydroxyphenyl)propionate) (CAS 6683-19-8) commercially available as IRGANOX™ 1010; and combinations thereof.

They may be combined with one or more polymers in range from 100 to 4000 parts by weight of the first antioxidant, based on one million parts of the polymer or polymer composition; alternatively, from 250 to 3000 parts by weight of the first antioxidant, based on one million parts of the polymer or polymer composition, alternatively, from 500 to 2500 parts by weight of the first antioxidant, based on one million parts of the polymer or polymer composition, alternatively, from 750 to 2500 parts by weight of the first antioxidant, based on one million parts of the polymer or polymer composition, alternatively, from 750 to 2000 parts by weight of the first antioxidant, based on one million parts of the polymer or polymer composition, and alternatively, from 1000 to 2000 parts by weight of the first antioxidant, based on one million parts of the polymer or polymer composition.

Second Antioxidant

The second antioxidant comprises one or more antioxidants. They include, but are not limited to, liquid phosphites, such as $C_2$-$C_7$, preferably $C_2$-$C_4$, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. In several embodiments of the invention, the second antioxidant may also be represented by the formula [4-(2-methylbutan-2-yl) phenyl]$_x$[2,4-bis(2-methylbutan-2-yl)phenyl]$_{3-x}$ phosphate, wherein x=0, 1, 2, 3, or combinations thereof.

Such antioxidants and their use with polyolefin polymers have been described in U.S. Patent Application Nos. 2005/0113494; 2007/0021537; 2009/0326112; 2013/0190434; 2013/225738; 2014/0045981; U.S. Pat. Nos. 5,254,709; 6,444,836; 7,888,414; 7,947,769; 8,008,383; 8,048,946; 8,188,170; and 8,258,214. An example of a commercially available liquid phosphite is sold under the tradename WESTON™ 705 (Addivant, Danbury, Conn.).

The second antioxidant may be combined with one or more polymers in the range from 100 to 4000 parts by weight of the second antioxidant, based on one million parts of the polymer or polymer composition; alternatively, from 250 to 3000 parts by weight of the second antioxidant, based on one million parts of the polymer or polymer composition, alternatively, from 300 to 2000 parts by weight of the second antioxidant, based on one million parts of the polymer or polymer composition, alternatively, from 400 to 1450 parts by weight of the second antioxidant, based on one million parts of the polymer or polymer composition, alternatively, from 425 to 1650 parts by weight of the second antioxidant, based on one million parts of the polymer or polymer composition, and alternatively, from 1 to 450 parts by weight of the second antioxidant, based on one million parts of the polymer or polymer composition.

The polymers and/or compositions comprising the first antioxidant and/or the second antioxidant described above may be used in combination with the following neutralizing agents, additional additives and other components.

Neutralizing Agents

One or more neutralizing agents (also called catalyst deactivators) include, but are not limited to, calcium stearate, zinc stearate, calcium oxide, synthetic hydrotalcite, such as DHT4A, and combinations thereof.

Additional Additives and Other Components

Additional additives and other components include, but are limited to, fillers (especially, silica, glass fibers, talc, etc.) colorants or dyes, pigments, color enhancers, whitening agents, cavitation agents, anti-slip agents, lubricants, plasticizers, processing aids, antistatic agents, antifogging agents, nucleating agents, stabilizers, mold release agents, and other antioxidants (for example, hindered amines and phosphates). Nucleating agents include, for example, sodium benzoate and talc. Slip agents include, for example, oleamide and erucamide.

End Use Applications

Any of the polymers and compositions in combination with the adhesion promoter, additives, and other components described herein may be used in a variety of end-use applications. For example, the polymers and composition described above may be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. Molding processes are well known to those of ordinary skill in the art.

Rotational Molding, also called rotomolding, or rotocast, is generally a thermoplastic process for producing hollow parts by placing powder or liquid resin into a hollow mold and then rotating that tool bi-axially in an oven until the resin melts and coats the inside of the mold cavity. In particular, rotomolding involves the following steps: a) a mold is loaded with a measured charge or shot weight of polymeric material (usually in powder form) into the mold; and b) the mold is heated in an oven while it rotates, until all the polymer has melted and adhered to the mold wall. The hollow part should be rotated through two or more axes, rotating at different speeds, in order to avoid the accumulation of polymer powder. The length of time the mold spends in the oven is critical, too long and the polymer will degrade, reducing its impact strength. If the mold spends too little time in the oven, the polymer melt may be incomplete as the polymer pellets or powder will not have time to fully melt and coalesce on the mold wall, resulting in large bubbles in the polymer. This has an adverse effect on the mechanical properties of the finished product. After correct time, rotations, and temperature, the mold is cooled, in step c) usually by a fan. The polymer(s) or composition must be cooled so that it solidifies and can be handled safely by the mold operator. This typically takes tens of minutes. The molded article will shrink on cooling, coming away from the mold, and facilitating easy removal of the part. The part is then removed from the mold in the final step d). Such processes and related equipment have been described in, for example, U.S. Pat. Nos. 4,342,716; 5,530,055; 6,338,623; 6,533,988; U.S. Patent Application Publication Nos. 2005/0017409 and 2014/0088221.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for improving the shrinkage of a rotomolding composition, the process comprising contacting at least one metallocene-catalyzed polyolefin polymer and from 1 to 7,500 ppm by weight of at least one adhesion promoter comprising a propylene-based elastomer, a hydrocarbon resin, a modified hydrocarbon resin, an ethylene glycol, or mixtures thereof, to produce the rotomolding composition, and rotomolding an article from the rotomolding composition, wherein the adhesion promoter promotes adhesion of the contact product to a mold surface used in the rotomolding.

2. A process for improving the shrinkage of a rotomolding composition, the process comprising contacting at least one metallocene-catalyzed polyolefin polymer and from 1 to 7,500 ppm by weight of at least one adhesion promoter to produce the rotomolding composition, recovering the rotomolding composition, transferring the rotomolding composition to a mold, and rotomolding an article from the rotomolding composition.

3. The process of claim 2, wherein the propylene-based elastomer comprises propylene and from 5 wt % to 25 wt % of a $C_4$-$C_{12}$ olefin, based upon the total weight of the elastomer, and has one or more of the following properties:
   a) a Tm of less than 115° C.;
   b) a heat of fusion of at least 0.5 J/g or less than 75 J/g;
   c) a triad tacticity of three propylene units of 75% or greater;
   d) a crystallinity of from 0.5% to 40.0%; and
   e) an MFR of from 10 to 50 g/10 min.

4. The process of claim 2, wherein the hydrocarbon resin and/or modified hydrocarbon resin have a softening point of from 180° F. to 285° F. (82.0° C. to 140.6° C.) and/or an aromaticity of from 2.0 to 12.0%.

5. The process of any one of the preceding claims, wherein from 1 to 5,000 ppm by weight of the at least one adhesion promoter is contacted with the at least one metallocene-catalyzed polyolefin polymer.

6. The process of any one of the preceding claims, wherein from 400 to 2,500 ppm by weight of the at least one adhesion promoter is contacted with the at least one metallocene-catalyzed polyolefin polymer.

7. The process of any one of the preceding claims, wherein from 500 to 2,000 ppm by weight of the at least one adhesion promoter is contacted with the at least one metallocene-catalyzed polyolefin polymer.

8. The process of any one of the preceding claims, wherein the process further comprises and prior to the contacting, polymerizing ethylene, optionally, with one more olefins, with a metallocene catalyst system to produce the at least one metallocene-catalyzed polyolefin polymer.

9. The process of claim 8, wherein the catalyst system comprises the contact product of a metal complex, an activator, and optionally, a silica support.

10. The process of claim 9, wherein the metal complex is selected from the group consisting of (1,3-MeBuCp)$_2$ZrMe$_2$, bis(1-Me,3-nBuCp)ZrCl$_2$, Cp(Indenyl)ZrMe$_2$, (Me$_4$Cp)(nPrCp)ZrMe$_2$, Me$_2$-bis-(tetrahydroindenyl)ZrCl$_2$, rac-dimethylsilylbis[(2-methyl-4-phenyl)indenyl] zirconiumdimethyl, rac-dimethylsilylbis[(2-methyl)indenyl] zirconiumdimethyl, bis(n-PrCp)HfCl$_2$, rac-dimethylsilyl-bis(indenyl)hafniumdimethyl, rac-dimethylsilyl-bis(indenyl)hafniumdichloride, and mixtures thereof.

11. The process of any one of the preceding claims, further comprising heating the rotomolding composition in a mold, rotating the mold, and cooling the mold to produce a rotomolded article.

12. A rotomolded article made from the contact product of at least one metallocene-catalyzed ethylene-based polymer and from 1 to 7,500 ppm by weight of at least one adhesion promoter that promotes adhesion of the contact product to a mold surface used in forming the rotomolded article, the at least one adhesion promoter comprising a propylene-based elastomer, a hydrocarbon resin, a modified hydrocarbon resin, an ethylene glycol, or mixtures thereof.

13. The rotomolded article of claim 12, wherein the ethylene-based polymer has a density from 0.930 to 0.945 g/cm$^3$.

14. The rotomolded article of claim 12, wherein the ethylene-based polymer has a melt index (I$_{2.16}$) from 3.0 to 7 g/10 min.

15. The rotomolded article of claim 12, wherein the ethylene-based polymer has a molecular weight distribution of from 2 to 4.

16. The rotomolded article of claim 12, wherein the contact product comprises from 1 to 5,000 ppm by weight of the at least one adhesion promoter.

17. The rotomolded article of claim 12, wherein the contact product comprises from 400 to 2,500 ppm by weight of the at least one adhesion promoter.

18. The rotomolded article of claim 12, wherein the contact product comprises from 500 to 2,000 ppm by weight of the at least one adhesion promoter.

19. The rotomolded article of claim 12, wherein the rotomolded article is selected from the group consisting of tanks, containers, cans, crates, vessels, coolers, sporting goods, recreational goods, automotive parts (external and internal), benches, seats, playground equipment, marine products, kayaks, sleds, cages, sheds, pallets, boat and water craft components, housing, covers, point of purchase displays, furniture (indoor and outdoor), safety equipment, household items, toys, and carts.

* * * * *